United States Patent Office 3,487,743
Patented Jan. 6, 1970

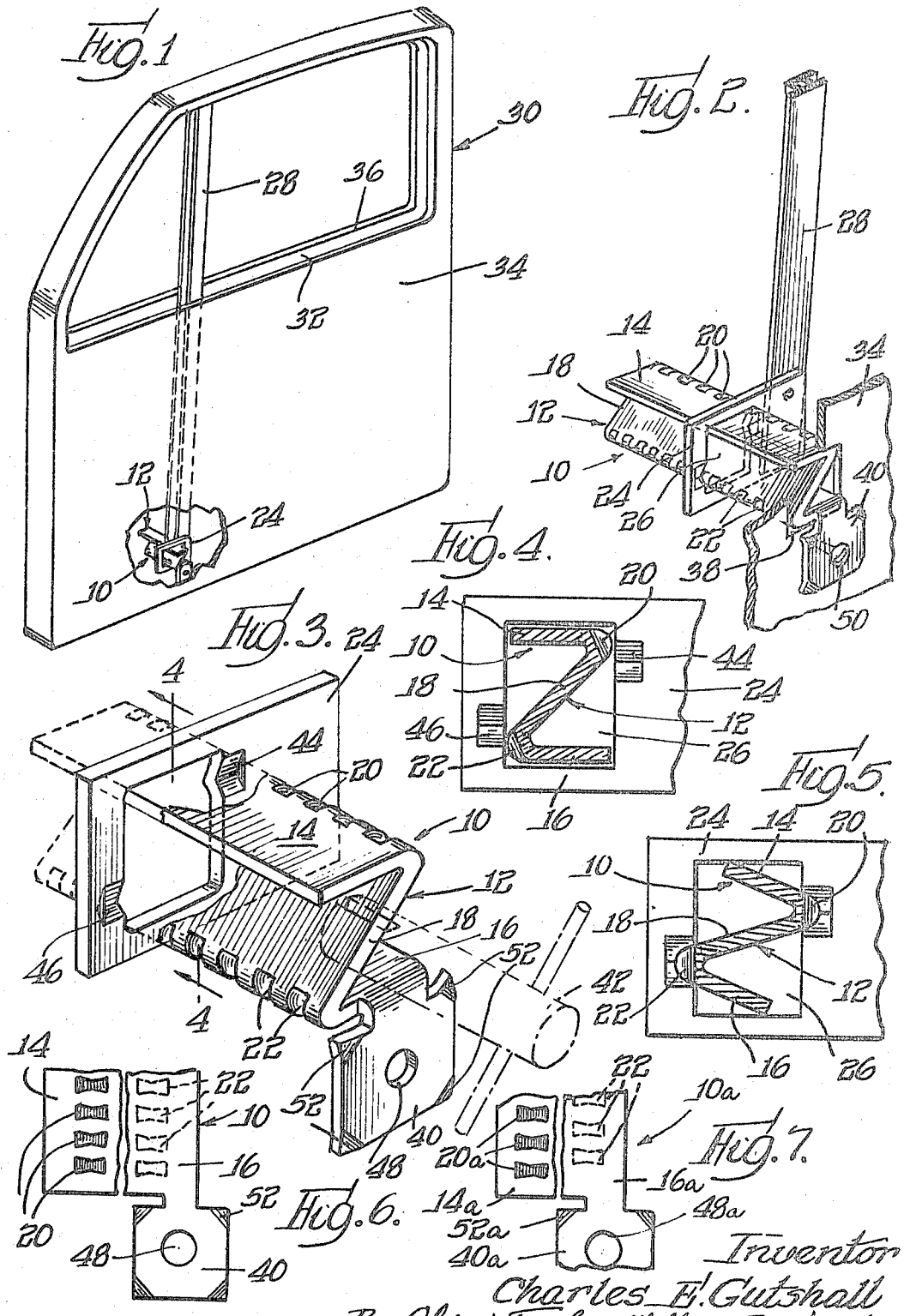

3,487,743
FASTENER WITH ROTARY SHANK
Charles E. Gutshall, Roselle, Ill., assignor to Illinois Tool
Works Inc., Chicago, Ill., a corporation of Delaware
Filed Sept. 9, 1968, Ser. No. 758,476
Int. Cl. F16b 35/00, 33/02, 39/28
U.S. Cl. 85—1
9 Claims

ABSTRACT OF THE DISCLOSURE

The present invention relates generally to fasteners having rotary shanks adapted for application to non-circular apertures of a workpiece. More specifically, the disclosed embodiment of the invention contemplates a fastener having a shank which is particularly designed for insertion within polygonally shaped apertures. To this end, the shank member is constructed of sheet material so formed that three longitudinal metallic strips of integrally connected material combine to present a shank which substantially defines a character Z in transverse section. Along the areas of juncture of these strips, peripheral, axially spaced recesses are provided for interlockingly engaging the marginal portions of a complementary workpiece which define a non-circular shank-accommodating aperture. Extending from and formed integral with one extremity of the shank is a section adapted for securing the shank against unauthorized displacement after the shank has been fully inserted and rotated to its final tightened position within the aperture of the workpiece.

---

It has been found, in certain applications where rotary fasteners have heretofore been used to secure a workpiece in position, that the fasteners having a shank especially designed for insertion within a polygonally shaped work aperture have proven to be very practical. For example, in the fabrication of the doors of automobiles, it has in some instances been customary to employ a vertical frame member positioned between the inner and outer sheet metal sides or walls of the door member. In such instances, it is common practice to lower the frame member into the space between the inner and outer sheet metal sides or walls of the door member. To fasten the lower extremity of the vertical frame member in proper position, it was deemed advisable to employ a screw member which was applied to the extremity of the vertical frame member before it was lowered into position. As the vertical frame, together with the screw or bolt attached thereto, was lowered into the space between the door walls, it was necessary to orient the frame member so as to ultimately position the outer or projecting extremity of the screw member into registration with an aperture in the inner door wall. When so located the screw member could be rotated for final tightening. This procedure required a considerable amount of time, skill, and effort which the present invention seeks to obviate.

It is therefore an important object of the present invention to provide a fastener which may be inserted through an aperture in a sheet metal panel such as the inner wall or panel of an automobile door after the part to be secured, such as the above-mentioned vertical frame member, has been lowered into an approximate position. To this end, the invention contemplates the use of a novel and efficiently operable fastener member having a shank designed for insertion and tightening within a non-circular or polygonally shaped aperture located in the vicinity of the lower extremity of the vertical frame member.

More specifically, the present invention contemplates a fastener having a shank of the type referred to above which in transverse section substantially defines a character Z, whereby diagonal corners of the Z-shaped shank may be brought into interlocking engagement with complementary work margins which define the shank-accommodating aperture.

In addition, the present invention contemplates the provision of a fastener of the type set forth above which, after it has been completely inserted and rotated to its final tightened position within the aperture of a workpiece, may be further secured against unauthorized loosening by auxiliary means formed integral with the fastener shank.

The foregoing and other advantages will be more apparent from the following details description when considered in connection with the accompanying drawing wherein:

FIG. 1 is a perspective view of a conventional automobile door structure of the type equipped with a vertical frame member adapted to be secured at its lower extremity by means of a fastener of the type contemplated by the present invention;

FIG. 2 is an enlarged perspective view of the fastener and lower extremity of the vertical frame member of FIG. 1 more clearly to illustrate the application of the fastener shank to the polygonal aperture located in the vicinity of the lower extremity of the vertical frame member, and also to show the manner in which an integral extension of the shank member serves as additional or auxiliary means for securing the fastener shank against unauthorized loosening, after said shank has been completely inserted and finally rotated into tightened position within the work aperture;

FIG. 3 is a still further enlarged perspective view of the fastener member, an associated work aperture, and also a tool, shown by dot-and-dash lines, which may be employed to impart rotation to the fastener shank;

FIG. 4 is a transverse sectional view taken substantially along the line 4—4 of FIG. 3, disclosing the relative position of the fastener shank upon initial insertion within the work aperture and before rotation is imparted to the shank;

FIG. 5 is a view similar to FIG. 4 showing the fastener shank after it has been rotated to tightened position within the work aperture;

FIG. 6 is a fragmentary disclosure of the blank from which the fastener is produced after the indentations have been made in the shank material but prior to folding or forming the material into Z shape, and prior to bending the fastener tab at right angles to the axis of the fastener shank; and FIG. 7 is a fragmentary view similar to FIG. 6 of a modified arrangement wherein the indentations are disposed in laterally staggered relation as distinguished from the aligned relation shown in FIG. 6.

Referring now to the drawing more in detail wherein like numerals have been employed to designate similar parts throughout the various views, a fastener device of the type contemplated by the present invention is disclosed generally by the numeral 10 in FIGS. 1 to 6, inclusive. The slightly modified shank structure in FIG. 7 is designated generally by the numeral 10a. The fastener 10 includes an elongated shank element 12 which in transverse section substantially defines a character Z. The shank 12 includes laterally spaced super-imposed strip sections or members 14 and 16 which in transverse section define the upper and lower portions, respectively, of the aforesaid character Z. These strip sections 14 and 16 are integrally connected by an intermediate strip section 18 which interconnects diagonally opposite longitudinal margins of the laterally spaced strip members 14 and 16. Thus, the strip member 18 in transverse section defines the diagonal of the aforesaid character Z.

Attention is directed to the provision of a plurality of axially spaced indentations or recesses 20 and 22 formed along diagonally opposite junctures of the intermediate strip 18 with the strips 14 and 16, respectively. The recesses 20 and 22 are in alignment and have a width determined by the thickness of the workpiece with which the fastener is to be used. In the disclosed embodiment, the workpiece is designated by the numeral 24. It will be noted that the workpiece 24 is provided with a polygonal or rectangular aperture 26 conforming substantially in peripheral shape to a rectangle defined by the periphery of the Z-shaped shank member 12.

For the purpose of illustrating one practical application of the present invention, the workpiece 24 is secured in a fixed position, as by welding, to the lower extremity of a vertical door frame member 28. The vertical frame member 28 is shown in assembled relation with an automobile car door designated generally by the numeral 30. In the initial assembly of the frame member 28 with the car door 30, the extremity of the frame member 28 carrying the workpiece or plate 24 is lowered within the space 32 (FIG. 1) presented between the inner and outer walls 34 and 36, respectively. An aperture 38 provided adjacent the lower margin of the wall or sheet metal door section 34 (FIG. 2) is sufficient in size to permit insertion of the shank 12 after the workpiece or plate 24 has been moved so as to bring the aperture 26 thereof into approximate registration with the aperture 38 in the door section 34.

The shank 12 may be longitudinally inserted within the apertures 38 and 26 until a tab 40 formed integral with and extending normal to the strip section 16 is juxtaposed with respect to the outer surface of the wall or side plate 34. In this position, the trailing extremity of the shank 12 will clear the inner surface of the wall 34 and thus permit rotation of the shank. When the desired vertical position of the frame member 28 is determined, rotation may be imparted to the shank 12, as by the application of a suitable turning tool 42, shown by dot and dash lines in FIG. 3. This causes the shank to be rotated from the position shown in FIG. 4 to the tightened position shown in FIG. 5. In this tightened position a pair of the transversely aligned notches or recesses 20 and 22 interlock with diagonally disposed margins of the workpiece 24 which define the aperture 26. In this position the walls of transversely aligned recesses 20 and 22 impinge the opposite sides of the workpiece 24 and the surfaces defining the bottom of such recesses impinge the diagonally disposed edges of the workpiece 24, as shown in FIG. 5.

It will also be noted that diagonally positioned indentations or recesses 44 and 46 are provided adjacent the work aperture 26 and serve to interlock with the walls or surfaces which define the above-mentioned diagonally disposed recesses 20 and 22. As the shank 12 is rotated to the position shown in FIG. 5, the free margins of the strip sections 14 and 16 are moved into resilient impingement with the adjacent upper and lower edges, respectively, defining the work aperture 26. In this manner the shank 12 and the frame member 28 may be firmly coupled. To insure against unauthorized retrograde rotation of the shank 12 after it has been moved to its tightened position illustrated in FIG. 5, a self-tapping screw 50 (FIG. 2) may be inserted within an aperture 48 (FIG. 3) in the tab 40. The screw penetrates the wall 34, and the head thereof may be tightened against the outer surface of the tab 40. In some instances it may be necessary to preform a small aperture in the wall section 34 by drilling or punching. As the head of the screw 50 is tightened against the outer surface of the tab 40, locking teeth 52 at each corner of the tab 40 aggressively impinge the outer surface of the wall 34. Thus, once the shank 12 has been rotated to its final tightened position within the workpiece 24, the tab and its associated screw 50 serve to prevent unauthorized subsequent loosening of the shank.

In order more effectively to cause firm impingement of the shank periphery with the edges of the workpiece 24, the opposed walls defining each of the indentations or recesses 20 and 22 are non-parallel or inclined with respect to each other. This affords a desired camming or wedging action which increases in aggressiveness of impingement of the shank periphery with the sides of the workpiece 24.

In FIG. 6, a fragmentary portion of a blank is shown from which the shank member may be ultimately configurated by bending the material into cross-sectional Z shape and the tab may be bent at right angles to the strip section 16. The arrangement of indentations or recesses 20 and 22 is such that the recesses 20 associated with the strip 14 are in transverse alignment with the complementary recesses 22.

In FIG. 7, slightly modified recesses 20a and 22a are shown. These recesses 20a and 22a are identical in shape to the previously described recesses 20 and 22, the only difference being that the recesses 20a are in staggered transverse relation with the recesses 22a. All other parts of the blank in FIG. 7 are identified by numerals corresponding with the numerals for like parts in FIG. 6, except for the addition of the suffix a. When the staggered relation of the indentations or recesses 20a and 22a are employed, only one diagonal margin of the shank interlocks at any given time with the complementary edges defining the aperture in the workpiece. This is distinguishable from the transversely aligned relationship of the indentations 20 and 22 previously described, wherein a pair of aligned recesses 20 and 22 contemporaneously intrelock with diagonally disposed edge portions of the workpiece 24.

From the foregoing, it will be apparent that the fastener described herein is particularly advantageous for use with non-circular or preferably polygonally shaped work apertures. It will also be apparent that by use of the fastener device contemplated by the present invention, the vertical frame member 28 with its associated plate 24 welded thereto may be lowered within the space between the walls of a door member without first having to apply a fastener member or screw to the frame member, as was previously necessary. Also, the fastener contemplated hereby may be produced with a minimum of cost and by the practice of conventional stamping and forming methods. This is possible, due to the fact that the fastener may be fabricated from a single sheet or strip of stock, as for example sheet metal. By forming or bending the sheet material or the blank into a shank which in transverse section substantially defines a character Z, a very effective and practical fastening device is presented. While for purposes of illustration the fastener of the present invention is described in operative association with a particular type of workpiece, namely, a workpiece which is used in the fabrication of an automobile door, obviously the fastener as described and claimed herein is adapted for a wide variety of applications in instances where it is desirable to employ non-circular or polygonally shaped work apertures.

What is claimed is:

1. A one-piece rotary type fastener for use with non-circular apertures of a workpiece including a shank element which in transverse section substantially defines a character Z, said shank element comprising a pair of laterally spaced superimposed strip members which in transverse section define the upper and lower portions of the aforesaid character Z and an intermediate strip member interconnecting diagonally opposite longitudinal margins of said laterally spaced strip members, said laterally spaced strip members being substantially planar with smooth external surfaces thereon and extending in substantially parallel relationship with each other, said interconnecting strip in transverse section defining the diagonal of said character Z, the junctures of said interconnecting strip with the longitudinal margin of each of said laterally spaced strips having a plurality of external, axially spaced peripheral recesses extending thereacross for interlockingly engaging the marginal portions of a complementary workpiece which define a noncircular shank accommodating aperture, and means extending from and formed integral with said shank element for securing said element against unauthorized displacement after said shank element has been rotated to its final tightened position within the aperture of said workpiece.

2. A rotary type fastener as set forth in claim 1, wherein the axially spaced peripheral recesses are defined by of indentations along the junctures of the interconnecting strip with said laterally spaced strips.

3. A rotary type fastener as set forth in claim 1, wherein the peripheral recesses at one juncture are in transverse alignment with respect to complementary peripheral recesses positioned along the other juncture.

4. A rotary type fastener as set forth in claim 1, wherein the axially spaced peripheral recesses at one juncture are in transverse staggered relation with respect to complementary peripheral recesses along the other juncture.

5. A rotary type fastener as set forth in claim 1, wherein the axially spaced peripheral recesses are defined by opposed wall surfaces which are inclined with respect to each other.

6. A rotary type fastener as set forth in claim 1, wherein the shank element comprises a unitary metallic sheet folded along laterally spaced longitudinal lines so as to define a character Z in transverse section.

7. A rotary type fastener as set forth in claim 1 wherein the means for securing the shank element against unauthorized displacement includes a section extending laterally of the trailing extremity of the shank element.

8. A rotary type fastener as set forth in claim 7 wherein the means for securing the shank element against unauthorized displacement is in the form of a tab provided with a screw accommodating aperture.

9. A rotary type fastener as set forth in claim 7 wherein the means for securing the shank element against unauthorized displacement is provided with teeth for lockingly impinging a work surface.

References Cited

UNITED STATES PATENTS

| | | | |
|---|---|---|---|
| 1,545,182 | 7/1925 | Beck | 151—54 |
| 2,002,741 | 5/1935 | Hunt | 151—37 X |
| 2,257,962 | 10/1941 | Kemper | 85—8.6 |
| 2,424,037 | 7/1947 | Jenkins | 85—47 X |
| 2,578,608 | 12/1951 | Shull. | |
| 3,240,102 | 3/1966 | Sandor | 85—47 |

RAMON S. BRITTS, Primary Examiner

U.S. Cl. X.R.

85—47; 151—37